Sept. 23, 1958     J. C. HAWKINS     2,853,190
DEVICES FOR USE IN THE CONVEYANCE OF ROOT CROPS Original Filed Nov. 4, 1955     3 Sheets-Sheet 1

FIG. I.

INVENTOR
JOHN C. HAWKINS

BY
Watson, Cole, Grindle & Watson
ATTORNEYS

INVENTOR
JOHN C. HAWKINS

Sept. 23, 1958     J. C. HAWKINS     2,853,190
DEVICES FOR USE IN THE CONVEYANCE OF ROOT CROPS
Original Filed Nov. 4, 1955     3 Sheets-Sheet 3

INVENTOR
JOHN C. HAWKINS.
BY
ATTORNEYS

United States Patent Office 2,853,190
Patented Sept. 23, 1958

2,853,190

DEVICES FOR USE IN THE CONVEYANCE OF ROOT CROPS

John Clement Hawkins, Silsoe, England, assignor to National Research Development Corporation, London, England, a British corporation Original application November 4, 1955, Serial No. 545,092. Divided and this application April 30, 1957, Serial No. 656,018

Claims priority, application Great Britain November 8, 1954

6 Claims. (Cl. 209—124)

This invention relates to devices for use in sorting roots of root crops from waste material.

When root crops are dug from the ground, whether by hand or by machine, the roots are usually accompanied by a good deal of waste material, such as soil, stones, haulm and weeds. Although a substantial degree of separation of the roots from the waste material can be effected by mechanical means, it is usually necessary for the final sorting to be done by hand. For this purpose it is known to place the roots and waste material to be sorted on a rotary sorting table which passes round before sorters who pick the roots from the sorting table and place them in sacks, leaving the waste material on the table. The waste material is then swept off the table in order to clear it for reeciving more material for sorting.

It is an object of the present invention to provide such a device which enables the sorters to work more efficiently.

According to the present invention, a device for use in sorting roots of root crops from waste material comprises a rotary sorting table on which the roots and waste material are deposited and which passes round before sorters, a shelf beneath the sorting table which rotates therewith and on to which selected roots removed from the table can be deposited, and an inclined fixed chute which extends upwardly around the periphery of the shelf in front of the sorters for guiding on to the shelf sorted roots which fall or are dropped over the edge of the sorting table.

This affords a distinct improvement over previous arrangements in which the sorters put the selected roots into sacks, since with such arrangements the sorters had to interrupt their sorting duties whenever a sack was filled, in order to replace it with an empty one.

The invention may be performed in various ways and one particular form of potato harvesting machine embodying the invention will now be described by way of example with reference to the accompanying drawings, in which Figure 1 is a plan view of the machine attached to the rear of the tractor;

Figure 1:
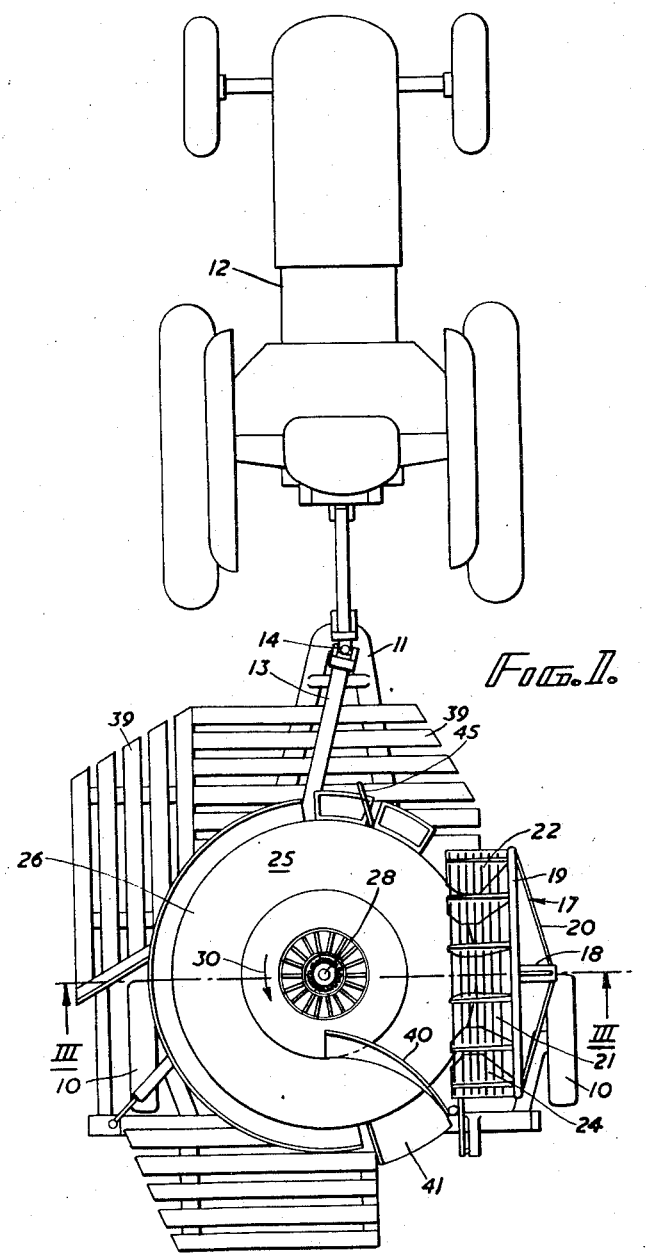
Figure 2:
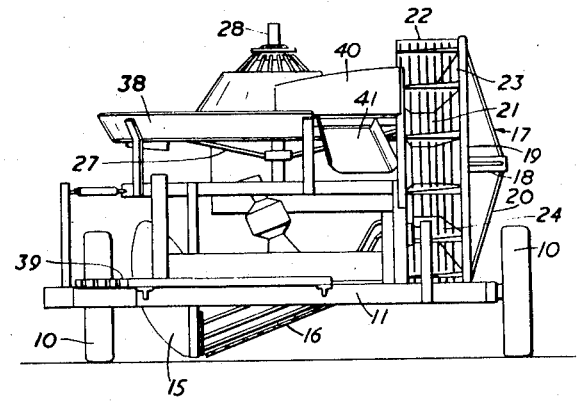
Figure 2 is a rear view of the machine.

The potato harvesting machine shown in the drawings is in the form of a trailer mounted on wheels 10 and comprises an approximately triangular framework 11, the apex of which is arranged for attachment to the draw bar of a tractor 12. The machine is also provided with a driving shaft 13 arranged for attachment through a universal coupling 14 with the power take-off of the tractor.

Disposed in the lower part of the machine is an inclined rotatable share 15. The tractor is driven across a potato field towing the machine and is guided so that the share 15 passes along the ridges in which the potatoes are growing. The share turns substantially the whole ridge, including soil, stones and the potato plants, onto an inclined rotating spider member 16. This spider member allows small stones and loose soil to fall back on to the ground but retains the potatoes, haulm, large stones and clods of earth. Near the highest point of the spider it passes beneath a deflector (which may be a board or, preferably, a roller). The deflector traps the haulm and separates the potatoes therefrom, deflecting the latter into the bottom of a rotary elevating drum 17. The parts hitherto mentioned are all known in principle in potato harvesting machines and so will not be further described in any detail, except for the elevating drum 17 which is of novel construction, embodying the present invention.

The elevating drum 17 is rotatably mounted on a horizontal shaft 18 and is driven through gearing (not shown) by the shaft 13. The drum comprises a vertical circular framework 19 braced by radial spokes 20. On the inner side of the framework is a deep cylindrical flange 21, the radius of which is approximately half the radius of the framework 19. Projecting axially from the rim of the framework 17 on the same side as the flange 21 is a fence 22 formed of circumferential bars. This fence allows soil, small stones and the like to fall through but retains larger bodies such as potatoes and large stones in the drum. Stretched between the rim of the framework 19 and the outer end of the flange 21 is a frusto-conical tautly stretched canvas sheet 23. At intervals around the drum within the fence are radial paddles 24, the inner edges of the paddles being inclined so as to lie close to the canvas sheet 23. Potatoes which are deflected into the drum from the spider 16 at or near the bottom of the drum strike the canvas sheet 23 which absorbs their impetus so that they then fall gently onto the fence 22. As the drum is rotated the paddles 24 lift the potatoes, together with large stones and the like, up to a level somewhat above the shaft 18, when the potatoes and other large bodies will roll down towards the centre of the drum. Since the canvas sheet 23 is of frusto-conical form this movement will also direct the potatoes and other large bodies outwardly from the drum so that they are discharged therefrom at a higher level than that at which they entered the drum.

Figure 3:
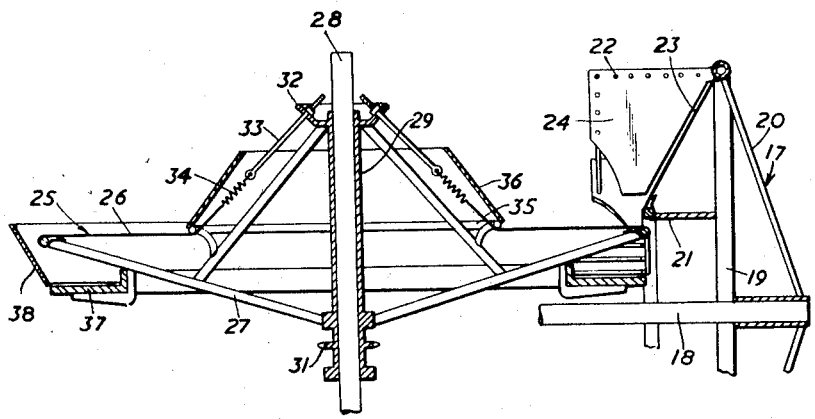
Figure 3 is a vertical section taken along the line III—III in Figure 1.
Figure 4:
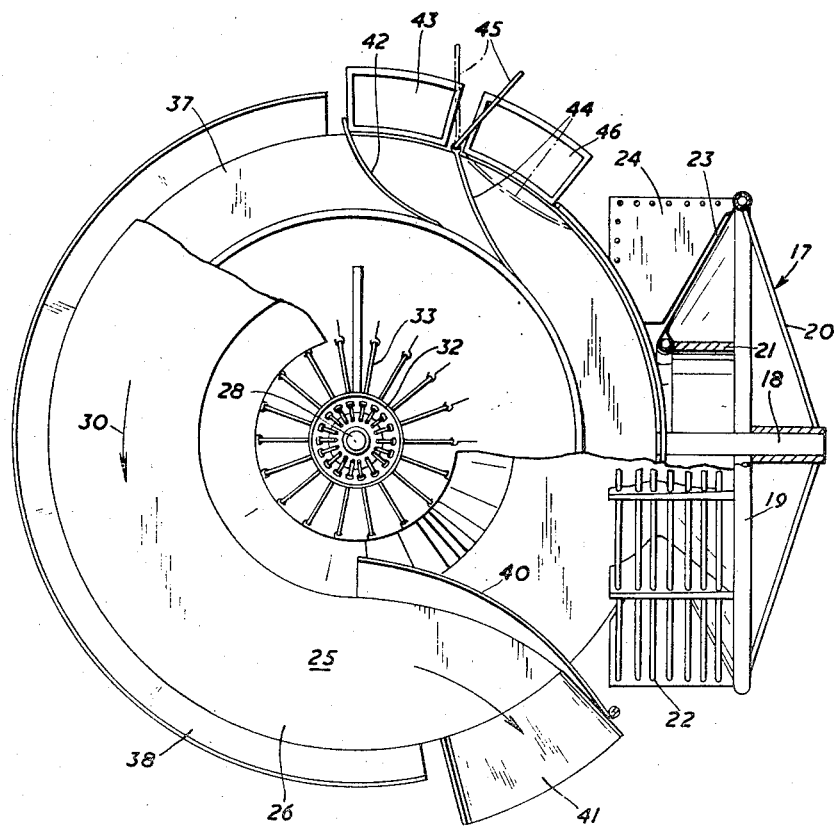
Figure 4 is a plan view of the sorting table and elevating conveyor on a large scale with parts broken away and parts shown in section.

The potatoes and other large bodies so discharged fall on to a rotary sorting table 25, the surface of which consists of a tautly stretched sheet of canvas 26. The outer periphery of the canvas sheet 26 is anchored to the outer rim of a circular framework 27 mounted on an upright shaft 28. The framework 27 is attached to a hub 29 which can rotate on the shaft 28 in the direction of the arrow 30 being driven by the shaft 13 through gearing including a gear wheel 31. At the upper end of the hub 28 is a cup member 32 which provides an anchorage for several radial bolts 33. The lower ends of these bolts are attached to tension spring 34 which are in turn attached to the inner edge of the canvas sheet 26. The sheet is passed under an inner circular member 35 of the framework 27 so that the major portion of its surface provides a flat tautly stretched annular fabric sorting table. A frusto-conical shield 36 is attached to the member 35 to protect the springs 34 and to prevent potatoes and other bodies from falling off the inner edge of the sorting table. The segment of the table that is nearest to the elevating drum 17 enters this drum, as best shown in Figures 3 and 4, so that the potatoes and other large bodies which are discharged from the elevating drum fall on to the sorting table 25 and are carried round thereon.

Attached to the framework 27 beneath the sorting table is a shelf 37 which rotates with the table. An inclined fixed chute 38 extends upwardly around the periphery of the shelf for a substantial proportion of its circumference. There is a gap between the chute 38 and the outer edge of the sorting table 25 big enough to enable any potatoes to pass through.

The machine is provided with platforms 39 on which several sorters can stand.

Over the rear portion of the sorting table, before it enters the elevating drum, is a curved deflector 40. This deflector catches any waste matter that has been left by the sorters on the sorting table and deflects such matter over a chute 41 from which it falls down on to the ground.

On the shelf 37 a similar fixed deflector 42 is provided which will deflect into a bagging-off chute 43 any potatoes placed on the shelf 37. There is a movable deflector 44 before the fixed deflector 42, which can be moved from position in which it is shown in full lines in Figure 4 to the position shown in dotted lines, and back again, by means of a hand lever 45. When the movable deflector 44 is in the position shown in full lines in Figure 4 it will deflect any potatoes that have been placed on the shelf 37 into a bagging-off chute 46, so that no potatoes will pass on to the fixed deflecetor 42 and the bagging-off chute 43. When the lever 45 is in this position, therefore, a receptacle under the bagging-off chute 43 can be removed and replaced. When the receptacle underneath the bagging-off chute 46 is full and an empty receptacle is in place underneath the bagging-off chute 43, the operator merely swings over the lever 45, thus moving the movable deflector 44 to close the bagging-off chute 46 so that any potates on the shelf 37 are carried round further and are deflected by the fixed deflector 42 into the bagging-off chute 43.

In operaiton, the tractor tows the machine along a ridge of potatoes, the share 15 turns the ridge on to the spider 16 where some soil and small stones are separated. When the deflector which cooperates with the spider is reached, haulm is separated from the potatoes which are then deflected, together with large stones and soil lumps, into the elevating drum 17. In the elevating drum further separation of soil and small stones may take place. The potatoes and any remaining stones and soil lumps fall on to the rotating sorting table 25 and are carried round thereon in front of the sorters. The sorters select potatoes, remove them from the sorting table, and deposit them on the shelf 37 by dropping them down the chute 38. By the time the fixed deflector 40 is reached, all the selected potatoes will have been removed from the sorting tables. The remaining waste matter is swept off the rotating table by the fixed deflector 40 so that a clean table surface enters the elevating drum to receive more potatoes, stones and the like.

The sorted potatoes on the shelf 37 are discharged into one of the bagging-off chutes 43 or 46.

Instead of bagging the potatoes on the machine they may be discarged into a bulk-receptacle. In this case only one potato discharging chute need be provided, the chute 46, the lever 45 and the movable deflector 44 being dispensed with and the chute 43 leading to a conveyor which discharges potatoes continuously into the bulk receptacle, for instance into a truck driven along beside the machine.

The tensioning of the fabric may be done by rubber or other elastic elements in place of the springs 34. Alternatively, if the fabric has adequate elasticity this may itself provide adequate tautness, in which case spring or elastic tensioning elements may be omitted.

In a further modification the direction of rotation of the sorting table 25 is reversed, the curved deflector 40 and the chute 41 in this case occupying the position occupied in the illustrated embodiment by the parts 42 to 46, and vice versa.

The expression "fabric" is used herein in a broad sense to include not only woven cloth such as canvas, but also any flexible sheet material such as rubber, or plastic sheet.

This application is a division from the present applicant's co-pending patent application Serial No. 545,092 filed November 4, 1955.

What I claim as my invention and desire to secure by Letters Patent is:

1. A device for facilitating the sorting of root crops from a mixture of root crops and waste matter, comprising a round table having a substantially horizontal surface, means for rotating said table about a vertical axis passing through its centre, means for discharging said mixture of root crops and waste matter on to said surface at a place that is stationary in relation to said axis, a shelf beneath said table adapted to rotate therewith and disposed to permit deposition thereon of selected roots removed from said table, and a fixed deflector disposed over said shelf adapted to deflect said selected roots from said shelf as said shelf passes under said fixed deflector.

2. A sorting device according to claim 1 which includes a movable deflector disposed over said shelf in front of said fixed deflector, operating means for said movable deflector adapted to move said movable deflector between an operative position in which it deflects said selected roots from said shelf before said selected roots reach said fixed deflector as said shelf passes beneath said movable deflector and an inoperative position in which said movable deflector lies substantially clear of said shelf whereby said selected roots carried round on said shelf are deflected therefrom by said fixed deflector as said shelf passes beneath said fixed deflector, and two discharge chutes each co-operating with one of said deflectors.

3. A sorting device according to claim 1 which includes a stationary deflector disposed above said sorting table immediately before said place at which said mixture of root crops and waste matter is discharged on to said table, said deflector being inclined in relation to the radial direction of said table so as to deflect from said table any matter present on said table as it passes under said deflector.

4. A sorting device according to claim 1 in which said substantially horizontal surface of said table is constituted by tautly-stretched flexible sheet material.

5. A sorting device according to claim 4 in which said sheet material is in the form of an annulus defined by an outer edge and an inner edge, and said table includes a rigid circular outer frame, means securing said sheet material to said outer frame adjacent the outer edge of said sheet material, a rigid circular inner frame contacting said sheet material adjacent said inner edge, and resilient anchorage means attached to said inner edge and maintaining said sheet in tension.

6. A sorting device according to claim 1 which includes an inclined fixed chute extending upwardly around the periphery of said shelf for guiding on to said shelf selected roots dropped over the periphery of said table.

References Cited in the file of this patent

UNITED STATES PATENTS

| | | |
|---|---|---|
| 562,824 | Hillman | June 30, 1896 |
| 847,071 | Herbert et al. | Mar. 12, 1907 |
| 1,906,331 | Phelps | May 2, 1933 |
| 2,315,013 | Pecker et al. | Mar. 30, 1943 |
| 2,488,983 | Packman | Nov. 22, 1949 |
| 2,494,417 | Talmage | Jan. 10, 1950 |
| 2,529,023 | Helms | Nov. 7, 1950 |
| 2,717,077 | Leighton et al. | Sept. 6, 1955 |
| 2,793,747 | Pridy | May 28, 1957 |

FOREIGN PATENTS

| | | |
|---|---|---|
| 738,123 | Great Britain | Oct. 5, 1955 |